UNITED STATES PATENT OFFICE.

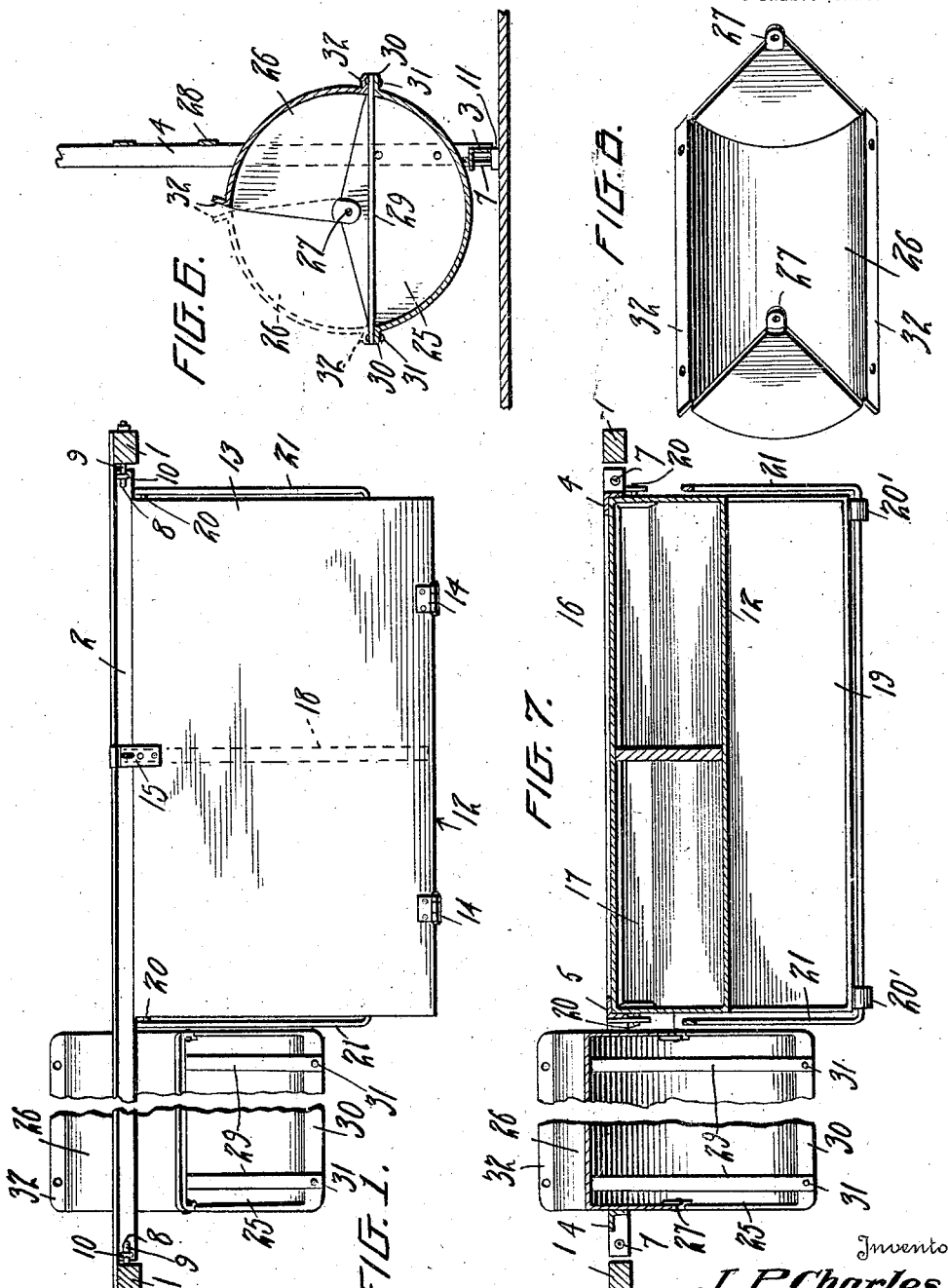

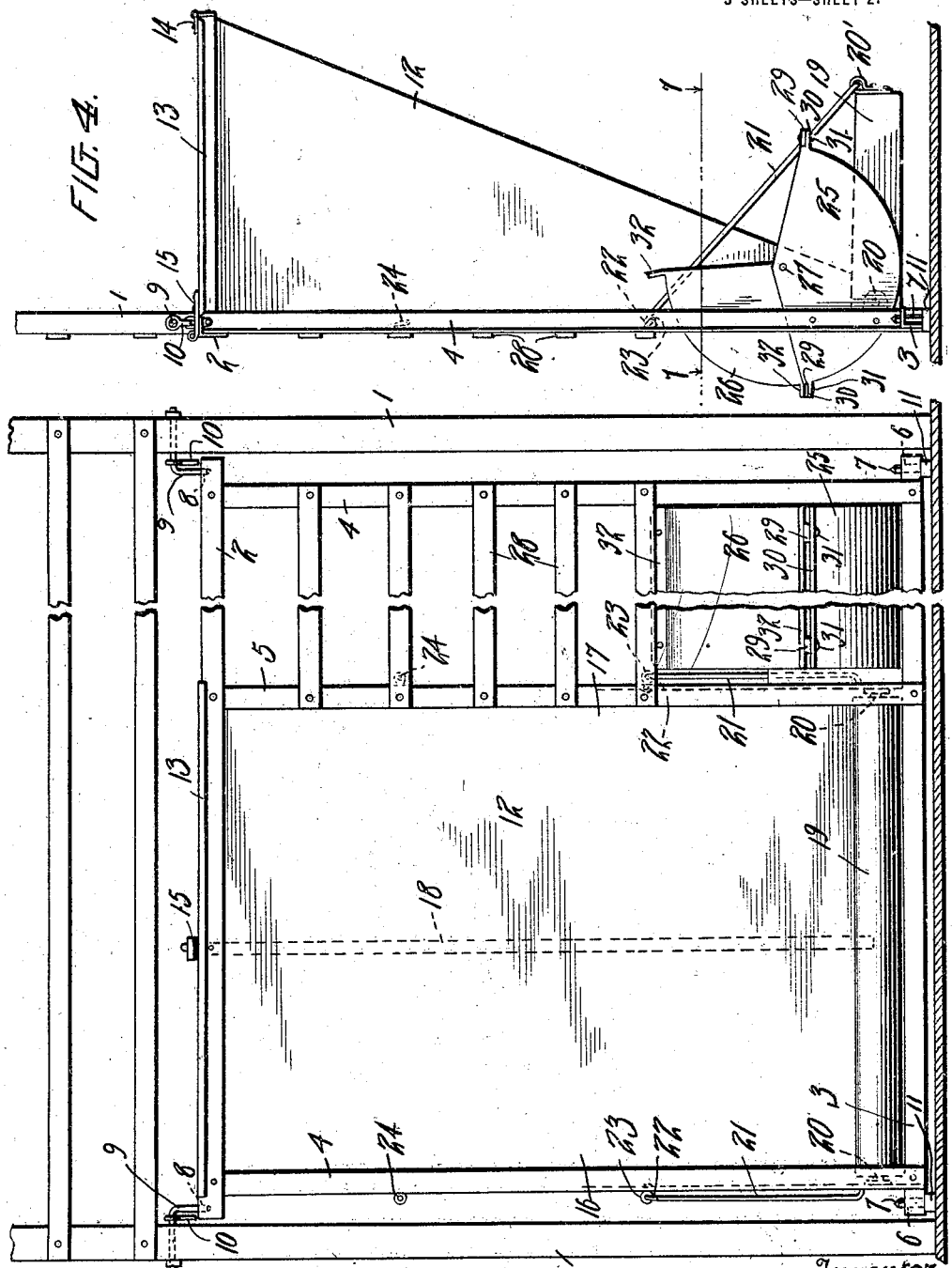

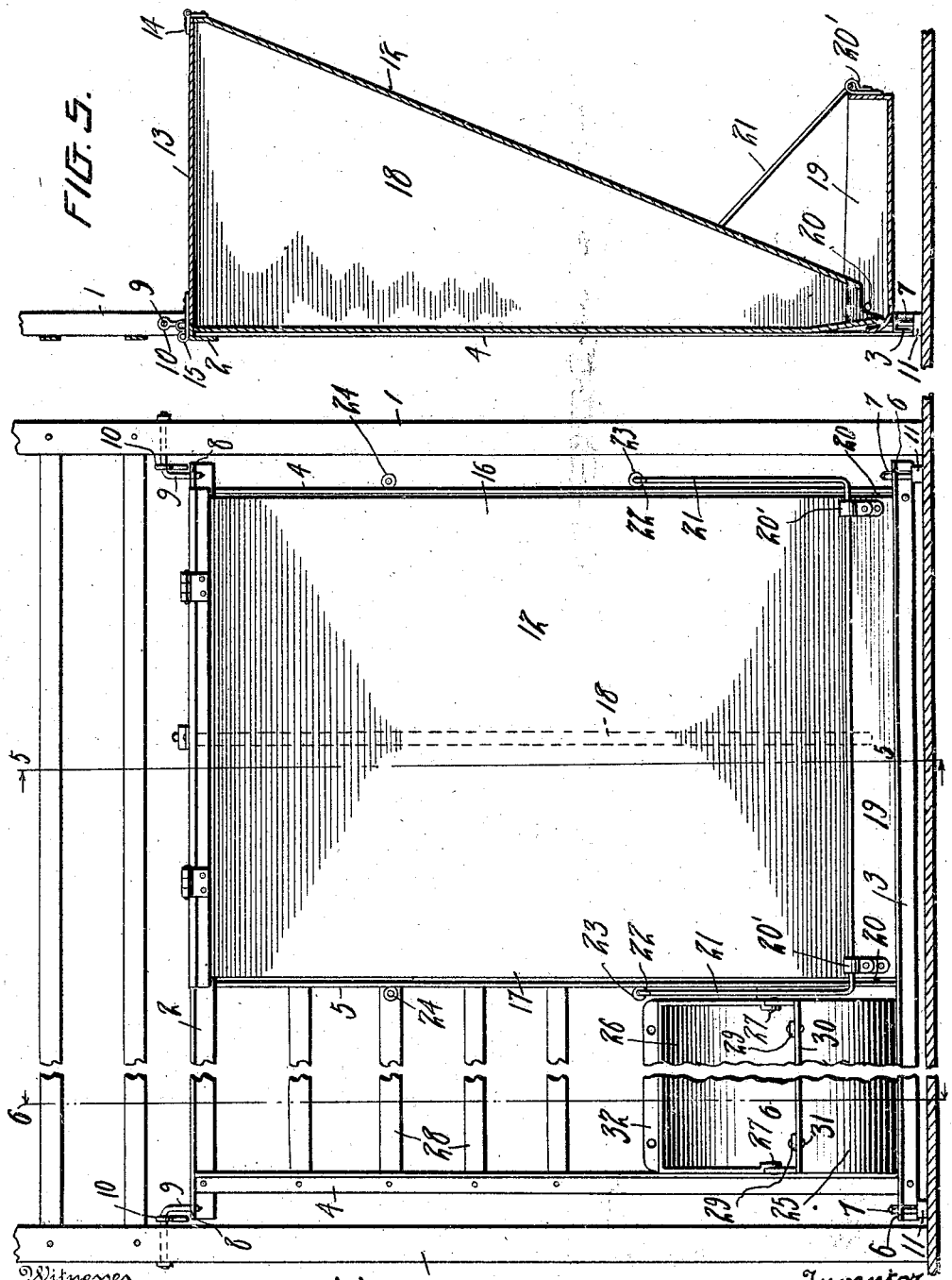

JOHN P. CHARLES, OF LAPORTE CITY, IOWA.

HOG-PEN FOUNT.

1,174,228.  Specification of Letters Patent.  Patented Mar. 7, 1916.

Application filed October 25, 1915. Serial No. 57,827.

*To all whom it may concern:*

Be it known that I, JOHN P. CHARLES, a citizen of the United States, residing at Laporte City, in the county of Blackhawk, State of Iowa, have invented certain new and useful Improvements in Hog-Pen Founts; and I do hereby declare the following to be a full, clear, and exact description of the invention, such as will enable others skilled in the art to which it appertains to make and use the same.

This invention relates to a hog pen fount.

An object of the invention resides in the provision of a device which includes a feed hopper and a water trough which may be built into a hog pen so that the hogs in said pen may be fed and watered without entering the pen.

A further object of the invention resides in so constructing the device that it will form a gate for the pen and may be swung open to close the alleyway between adjacent rows of pens to guide the animals into the pen.

A still further object of the invention resides in so constructing the device that the feed trough may be rendered inaccessible from within the pen during the placing of the feed and water therein.

With these and other objects in view, such as will appear as the description progresses, my invention comprises the combination and arrangement of parts as set forth in and falling within the scope of the appended claims.

Referring to the drawing: Figure 1 is a plan view of my device. Fig. 2 is a front elevation. Fig. 3 is a rear elevation. Fig. 4 is an end elevation with the near supporting post removed. Fig. 5 is a vertical section on line 5—5 of Fig. 3 taken through the feed hopper. Fig. 6 is a similar view taken on line 6—6 of Fig. 3. Fig. 7 is a horizontal sectional view on line 7—7 of Fig. 4. Fig. 8 is a fragmental detail.

Referring to the drawing wherein like parts are indicated by like characters throughout the several views:—In the embodiment of my invention shown in the drawings, I have provided a pair of spaced posts 1 on which the device is mounted. Mounted between these posts 1 is a frame which comprises an upper bar 2, a lower bar 3, end bars 4 and an intermediate bar 5. The upper bar 2 and the lower bar 3 extend slightly beyond the end bars 4 and the lower bar is provided at each end with a hole 6 through which a pin 7 extends which is mounted between the posts 1 on a suitable support, such as the floor of the pen. The upper bar 2 is provided with perforations in its upper face into which angular bolts 9 are adapted to extend. Pivotally mounted on the horizontal portions of these bolts 9 are retaining pawls 10 which are adapted to engage the upper face of the bar 2 and prevent its being lifted. The lengths of the pins 7 and the vertical portions of the bolts 9 are such that when the pawls 10 are swung outwardly the lower bar may be lifted off of the pins 7 and when it is again lowered it will be free from the bolts 9. This is because of the fact that the lower bar 3 rests upon a base 11 of the pins in spaced relation to the floor. Now when it is desired to swing the frame so as to allow access to the pen the pawl 10 at one end of the frame is swung outwardly and the frame lifted until the lower bar is disengaged from the adjacent pin. The frame is then allowed to drop downwardly and it will be disengaged from the bolt 9 at the adjacent end of the frame. At this time the frame will still be pivoted on the pin 7 and bolt 9 at the other end of the frame so that the frame may be swung outwardly about the said bolt and pin as a pivot.

Mounted on one end of the frame is a hopper 12, the outer face of which is vertical and the inner face of which is inclined, as clearly illustrated in Fig. 4 of the drawing. The upper end of this hopper is closed by means of a cover 13 which is hinged, as at 14, and has a hasp 15 thereon by means of which it may be locked. The hopper is divided into two compartments 16 and 17 being divided by a suitable wall 18. The lower end of the hopper terminates in spaced relation to the floor. Located beneath the lower open end of this hopper is a feed trough 19 which is pivoted, as at 20, at its inner end so that it may be swung upwardly to prevent access thereto. Pivotally secured to the opposite ends of this trough 19 by means of clips 20' are rods 21 which have hooks 22 on their upper ends. These hooks are adapted to engage either of the lower swiveled eyes 23 or the upper swiveled eyes 24. When the hooks are engaged with the lower eyes the feed trough will be supported in a horizontal position so that the animals within the pen may have free access thereto, but when the hooks are engaged with the upper eyes the trough will be swung upwardly into an inclined position and access thereto will be prevented. This hopper 12 does not extend the full length of the frame and in order that liquids may be fed to the animals within the pen, I have provided a liquid trough 25. This trough is substantially of semi-cylindrical formation and has a cover 26 pivotally mounted thereon, as at 27, which may be swung to close either side of the trough, that is, so that access to the trough from within the pen will be prevented during the filling of the trough or so that the escape of animals from the pen when the trough is accessible will be prevented. The former position is shown in dotted lines in Fig. 6 of the drawing and the latter position in full lines in this figure.

Extending across the frame adjacent the liquid trough are a plurality of bars 28 which prevent the escape of the animals from the pen by passing above the trough. The liquid trough 25 is provided with transversely extending braces 29 which are secured to lips 30 on the front and rear of the trough by bolts 31. The cover 26 is provided with lips 32 which have apertures therein adapted to fit over the heads of the bolts 31 when the cover is in either of its positions.

From the foregoing description it will be seen that I have provided a hog pen fount which consists of a feed hopper, a feed trough and a liquid trough which are mounted on a frame. I have so supported this frame that it forms, in effect, a gate for the pen and may be swung outwardly to guide the animals into the pen. Furthermore I have arranged the hopper and liquid trough in such manner that they may be filled from the alleyway between the rows of pens and I have mounted the feed trough so that it may be swung upwardly and rendered inaccessible from within the pen as desired by the operator. Furthermore I have pivotally mounted the cover of the liquid trough so that it may be swung into position to render the trough inaccessible from within the pen during the filling of the same and so that it may be swung closed to prevent the escape of the animals from the pen after the trough has been filled.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a hog pen fount, the combination with a pair of spaced posts, of a pair of angular bolts having downwardly extending vertical portions thereon, a pair of pins mounted in spaced relation to the posts, a frame having an upper bar and a lower bar, the upper bar having holes in the upper face thereof for receiving the lower ends of the bolts, the lower bar having holes therethrough for receiving the said pins, pawls mounted on the said bolts to maintain the frame thereon, and a feed hopper mounted on said frame.

2. In a hog pen fount, the combination with a pair of spaced posts, of a pair of angular bolts having downwardly extending vertical portions and horizontally extending portions, a pair of pins mounted in spaced relation to the posts at the lower ends thereof, a rectangular frame having an upper and a lower bar, the upper bar having holes therethrough for the reception of the bolts and being slidable on the vertical portions of the bolts, the lower bar having holes therethrough for the reception of the pins, the lengths of the vertical portions of the bolts being greater than the lengths of the pins, pawls mounted on the bolts arranged to engage the upper face of the upper bar and a feed hopper mounted on the frame.

In testimony whereof, I affix my signature, in the presence of two witnesses.

JOHN P. CHARLES.

Witnesses:
C. V. BOOTS,
S. R. WILCOX.